Patented Apr. 4, 1950

2,502,433

UNITED STATES PATENT OFFICE 2,502,433

ACETALS OF OXY AND POLYOXY α,ω-ALDEHYDES AND PROCESS OF PREPARING THE SAME

John W. Copenhaver, Easton, Pa., assignor to General Aniline & Film Corporation, New York, N. Y., a corporation of Delaware No Drawing. Application November 13, 1948, Serial No. 59,975

11 Claims. (Cl. 260—615)

This invention relates to a method for reacting acetals of 1,3-dicarbonyl compounds with vinyl ethers to produce α,ω-polyoxy acetals.

In my copending application Serial No. 719,113, filed December 8, 1946, I have disclosed a process for preparing acetals of 1,3-oxocarbonylic compounds by the reaction of orthoesters with vinyl ethers. In this said application, it was also disclosed that higher boiling products than the 1:1 adduct were also obtained which presumably were formed by the reaction of the primary 1:1 reaction product (the acetal of a 1,3-dicarbonyl compound) with another molecule of vinyl ether.

I have now found that acetals of 1,3-dicarbonyl compounds will readily react with vinyl ethers in the presence of acidic catalysts, to give good yields of the reaction product of the acetal with one or more vinyl ether molecules. The reaction may be formulated as follows:

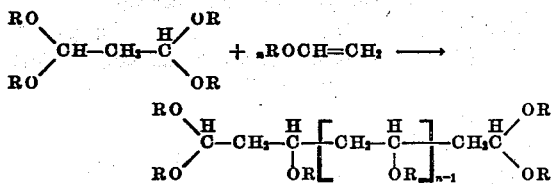

wherein the R groups represent the same or different hydrocarbon radicals selected from the group consisting of alkyl, aryl and aralkyl; and $n$ is an integer, generally less than 10 and more usually 5 or lower.

In order to facilitate the description of the present invention, there is given below a detailed description of a specific example thereof:

Example 1236 grams (6 mols) of methyl triethyl acetal of malonaldehyde and 0.6 ml. of boron trifluoride etherate were charged to a 2-liter, 3-necked flask fitted with a sealed stirrer, condenser, thermometer and a gas inlet. 123 grams (2.06 mols) of methyl vinyl ether were then passed in through the gas inlet tube during a period of 2 hours and the reaction temperature maintained at 35–45° C. After all of the methyl vinyl ether had been added, the reaction mixture was stirred for 1 hour and the catalyst was then neutralized with sodium methylate. The reaction mixture was then distilled at reduced pressure and after removing the unreacted malonaldehyde acetal, there was obtained 188 grams of dimethoxy triethoxy pentane (boiling point 83° C./0.5 mm.), $n_D^{25}$ 1.4202.

Analysis—Calculated for $C_{13}H_{28}O_5$: C, 59.06; H, 10.67. Found: C, 59.01; H, 10.82 and 76 grams of trimethoxy triethoxy heptane (boiling point 141–143° C./2 mm.) $n_D^{25}$ 1.4272.

Analysis—Calculated for $C_{16}H_{34}O_6$: C, 59.60; H, 10.63. Found: C, 59.52; H. 10.44 and 39 grams of tetramethoxy triethoxy nonane (boiling point 168–170° C./2.0 mm.) $n_D^{25}$ 1.4324.

There was also a small still residue which contained the reaction products of four or more units of the methyl vinyl ether with the malonaldehyde acetal.

It will be understood that the foregoing example is merely illustrative of the present invention and that various modifications thereof will suggest themselves to those skilled in the art. In particular, it should be noted that by selection of the specific reactants which are employed, a wide variety of products may be obtained, as indicated by the equation given above. In general, it is preferable to employ the lower tetra-alkyl acetals of 1,3-dicarbonyl compounds, since the products of the present invention are of particular value as intermediates in chemical syntheses wherein the acetal groups are hydrolyzed, so that the groups OR are removed.

As examples of acetals of 1,3-dicarbonyl compounds which may be employed in addition to methyl triethyl acetal of malonaldehyde, may be mentioned other acetals of malonaldehyde such as tetramethyl acetal of malonaldehyde, butyl trimethyl acetal of malonaldehyde, tetraethyl acetal of malonaldehyde, ethyl trimethyl acetal of malonaldehyde. However, if desired, acetals of malonaldehyde and its homologues other than the lower alkyl acetals thereof may be employed. As examples of compounds of this type which may be employed may be mentioned: 1-stearyl-1,3,3-trimethyl acetal of malonaldehyde; 1-phenyl-1,3,3-triethyl acetal of malonaldehyde and 1-benzyl-1,3,3-trimethyl acetal of malonaldehyde.

Likewise, the vinyl ethers which are employed in practicing the present invention are preferably the lower alkyl vinyl ethers such as methyl vinyl ether, ethyl vinyl ether, propyl vinyl ether, isopropyl vinyl ether, butyl vinyl ether, isobutyl vinyl ether, amyl vinyl ether, isoamyl vinyl ether, and the like. However, so far as operability is concerned, higher alkyl vinyl ethers such as stearyl vinyl ether may be employed, or aryl vinyl ether such as phenyl vinyl ether or alkaryl vinyl ether, such as benzyl vinyl ether, may be employed.

It has been found that the reaction conditions which should be employed in practicing the present invention are similar to those which have been found useful in the process of my aforesaid copending application for reacting vinyl ethers with orthoesters.

Thus, the catalyst employed in practicing the present invention is, as mentioned, an acid reacting condensing agent of the Friedel-Crafts type. As examples of suitable catalysts may be mentioned such acid reacting condensing agents as boron trifluoride and its complexes with ether, boron trichloride, stannic chloride, titanium chloride, antimony trichloride, bismuth trichloride, sulfuric acid and the like. The amount of catalyst is not highly critical and may be varied from mere traces to about 0.1 mol of catalyst per mol of acetal of 1,3-dicarbonyl compound. However, for best results, employing a catalyst like boron trifluoride, amounts within the range of 0.0001 to 0.01 mol of catalyst per mol of acetal are preferred.

It has also been found that the reaction is operable through a relatively wide temperature range and the critical limits for temperature have not been established. However, while temperatures below 0° C. are operative, no advantage has been found in employing such lower temperatures and likewise, temperatures above 50° C. are preferably avoided, since there is no advantage in their use, although the process has been found operative at temperatures of 100° C. and even higher. When the temperature employed is above the boiling point of any of the reactants, the process can advantageously be carried out under superatmospheric pressure; otherwise atmospheric pressure may be employed.

In carrying out the present invention, it has been found advantageous to employ an excess of the acetal over the vinyl ether and preferably from 2 to 4 mols of acetal are employed per mol of vinyl ether.

I claim:

1. The method of producing oxy and polyoxy acetals of $\alpha,\omega$-dicarbonyl compounds, which comprises reacting a vinyl ether with an acetal of a 1,3-dicarbonyl compound at a temperature of from 0-100° C. in the presence of an acid reacting condensing agent.

2. The method as defined in claim 1, wherein an excess of the acetal specified is employed.

3. The method as defined in claim 2, wherein the acetal employed is a lower alkyl acetal.

4. The method as defined in claim 3, wherein the vinyl ether employed is a lower alkyl vinyl ether.

5. The method as defined in claim 2, wherein the acid reacting condensing agent specified is boron trifluoride.

6. The method as defined in claim 3, wherein the acid reacting condensing agent specified is boron trifluoride.

7. The method as defined in claim 4, wherein the acid reacting condensing agent specified is boron trifluoride.

8. Acetals of oxy and polyoxy $\alpha,\omega$-aldehydes, said acetals having the formula:

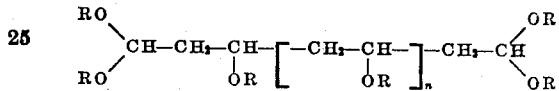

wherein R represents a member of the group consisting of alkyl, aryl and aralkyl radicals and $n$ is a whole number of from 0 to 10 inclusive.

9. 1,1,3,5,5-penta-lower alkoxy pentane.

10. 1,1,3,5,7,7-hexa-lower alkoxy heptane.

11. 1,1,3,5,7,9,9-hepta-lower alkoxy nonane.

JOHN W. COPENHAVER.

REFERENCES CITED

The following references are of record in the file of this patent:

UNITED STATES PATENTS

| Number | Name | Date |
|---|---|---|
| 2,425,042 | McNamee et al. | Aug. 5, 1947 |